2,996,504
NEW MORPHOLINE COMPOUNDS

Markus Zimmermann, Riehen, near Basel, and Franz Häfliger, Basel, Switzerland, assignors to Geigy Chemical Corporation, New York, N.Y., a corporation of Delaware
No Drawing. Filed Mar. 24, 1958, Ser. No. 723,153
Claims priority, application Switzerland Apr. 5, 1957
7 Claims. (Cl. 260—247.5)

The present invention concerns processes for the production of new morpholine compounds as well as the compounds obtained by these processes which have valuable pharmacological properties.

It has surprisingly been found that morpholine compounds of the general formula:

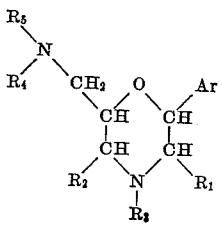
I as well as the mono- and bis-quaternary ammonium and diammonium compounds obtained therefrom by reacting with alkylating and alkenylating agents, halogen acetic acid alkyl esters or aralkyl halides, have valuable neurophysiological properties. In particular, the ditertiary bases reduce the blood pressure and in particular have a stimulating action on the central nervous system and the quaternary compounds in particular reduce the blood pressure to a marked degree. In the above formula:

Ar represents an aryl radical possibly substituted by halogen, alkyl, alkoxy or hydroxyl groups, $R_1$ and $R_2$ represent hydrogen or low molecular alkyl radicals, $R_3$ represents hydrogen or a low molecular alkyl or alkenyl radical, and $R_4$ and $R_5$ each represent hydrogen or alkyl, alkoxyalkyl, dialkylaminoalkyl or alkenyl radicals, and if $R_4$ and $R_5$ are alkyl radicals they can be bound to each other either direct or by way of —O— or the —N(alkyl)- group.

The compounds defined above can be produced in a simple manner by treating a compound of the general formula:

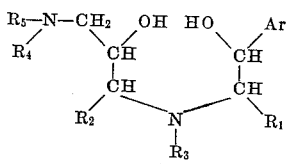
II wherein Ar, $R_1$, $R_2$, $R_3$ and $R_4$ have the meanings given above with an agent which splits off water and if desired, reacting ditertiary compounds of the general Formula I, i.e. compounds in which $R_3$, $R_4$ and $R_5$ do not represent hydrogen, with at least one mol of a low molecular alkylating or alkenylating agent. Mineral acids for example such as concentrated sulphuric acid or 48% hydrobromic acid are suitable as agents which split off water. If sulphuric acid is used, ring closure is obtained already in the cold; on using hydrobromic acid the reaction mixture must be heated.

If hydroxyl groups are present in Ar, the ring may be closed under considerably milder conditions, e.g. by allowing hydrohalides of such compounds of the general Formula II to stand in an alcohol or gently heating them.

In this case one or two mols of hydrogen halide are thus sufficient as agent which splits off water.

Alkyl and alkenyl halides for example such as methyl chloride, methyl bromide, methyl iodide, ethyl chloride, ethyl bromide, allyl iodide, methallyl bromide and crotyl bromide; also p-toluene sulphonic acid methyl ester, dimethyl sulphate and diethyl sulphate as well as bromoacetic acid ethyl ester, benzyl chloride or p-chlorobenzyl chloride can be use e.g. to mono or bisquaternise the compounds of the general Formula I in which $R_3$, $R_4$ and $R_5$ do not represent hydrogen.

Compounds of the general Formula II can be obtained for example by reacting a hydroxy amine of the general formula:

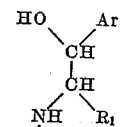
III with an oxirane of the general formula:

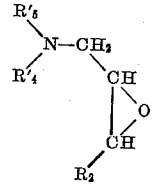
IV wherein $R'_4$ and $R'_5$ have the meanings given for $R_4$ and $R_5$ above with the exception of hydrogen and $Ar_1$, $R_1$, $R_2$ and $R_3$ have the meanings given above. The crude products obtained in this case can be used direct for ring closure. The reactions of the hydroxyamines with the oxiranes can be performed in the presence or, generally more advantageously in the absence of inert organic solvents at room temperature or on heating. If stereoisomeric starting materials differ only in the configuration at the carbon atom having the hydroxyl group, they can produce optically identical end products so that such racemates can be used instead of the optically pure compounds as starting materials.

Suitable starting materials of the general Formula III are for example 1-phenyl-2-amino-ethanol, 1-phenyl-2-amino-propanol, 1-phenyl-2-methylamino-propanol, in particular L-ephedrine, 1-p-tolyl-2-methylamino-propanol, 1-(p-chlorophenyl)-2-methylamino-propanol, 1-p-anisyl-2-methylamino-propanol, 1-(p-hydroxyphenyl)-2-methyl-amino-ethanol, 1-(m.p-dihydroxy-phenyl)-2-methylamino-ethanol, 1-(p-hydroxyphenyl)-2-n-butylamino-ethanol, 1-(m.p-dihydroxy-phenyl)-2-amino-propanol and 1-(m.p-dihydroxyphenyl)-2-methylamino-propanol.

These hydroxyamines can be reacted with, for example 1-dimethylamino-, 1-diethylamino-, 1-(methyl-ethylamino)-, 1 di-n-propylamino-, 1-di-n-butylamino-, 1-(methyl-n-butylamino)-, 1-di-isobutylamino-, 1-(methyl-allylamino)-, 1-diallylamino, 1-(N-diethylaminoethyl-ethylamino)-, 1-(ethoxyethyl-methylamino)-, 1-pyrrolidino-, 1-piperidino-, 1-(N'-methyl-piperazino)- and 1-morpholino-2.3-epoxy-propane or -2.3-epoxy butane.

Also starting materials of the general Formula II are obtained by means of the same reaction by reacting a diaminoalkanol of the general formula:

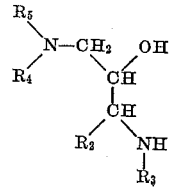
V with an oxirane of the general formula:

wherein Ar, $R_1$, $R_2$, $R_3$, $R_4$ and $R_5$ have the meanings given above. In this case too the crude products can be used direct for ring closure.

In this case suitable hydroxy amines are in particular 1-amino- and 1-alkylamino-2-hydroxy-3-dialkylamino-propane and similar compounds such as for example 1-amino-, 1-methylamino- and 1-ethylamino-2-hydroxy-3-dimethylamino-propane, -3-diethylamino-propane, -3-pyrrolidino-propane, -3-piperidino-propane and -3-morpholino-propane. As hydroxy amines in which $R_5$ is hydrogen, those in particular are used in which the group —NH—$R_3$ is either identical to the group —NH—$R_4$ or those the reactivity of which is considerably superior to that of the —NH—$R_4$ group; as examples can be mentioned 1.3-diamino-, 1.3-bis-methylamino- and 1.3-bis-ethylamino-2-hydroxy-propane as well as 1-amino-3-n-butylamino-2-hydroxy-propane and 1-methylamino-3-isopropylamino-2-hydroxy-propane.

Starting materials of the general Formula II can also be obtained if, instead of the oxiranes of the general Formulae IV or VI, corresponding halogen hydrins are reacted with hydroxy amines of the general Formula III or V.

In addition, compounds of the general Formula I are obtained by reacting an aminomethyl morpholine compound of the general formula:

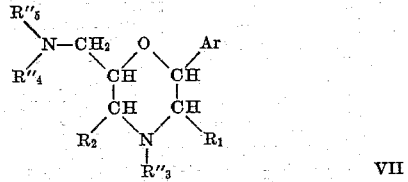

wherein $R''_3$, $R''_4$ and $R''_5$ have the meanings given for the radicals $R_3$, $R_4$ and $R_5$ but at least one of these three symbols must represent hydrogen however, and Ar, $R_1$ and $R_2$ have the meanings given above, with low molecular alkylating or alkenylating agents such as for example low molecular alkyl or alkenyl halides, aryl sulphonic acid alkyl esters, dialkyl sulphates or formaldehyde, the reaction being performed in the presence of formic acid. The compounds of the general Formula VI are obtained by the two processes first above mentioned by using starting materials having a primary amino group of the general Formulae II or IV.

Finally compounds of the general Formula I can also be obtained by reacting a halogen methyl morpholine compound of the general formula:

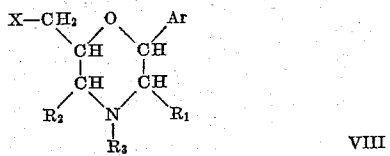

wherein X represents a halogen atom, in particular chlorine or bromine and Ar, $R_1$, $R_2$ and $R_3$ have the meanings given above, with an amine of the general formula:

wherein $R_4$ and $R_5$ have the meanings given above. Suitable starting materials of the general Formula VIII are obtained for example by reacting hydroxyamines of the general Formula III with glycide and then with thionyl chloride, or by reacting them with epichlorohydrin or epibromohydrin. Examples of starting materials of the general Formula IX are ammonia, primary amines such as methylamine, ethylamine, n-propylamine, isopropylamine, n-butylamine, isobutylamine, n-amylamine, isoamylamine, allylamine, and methallylamine; also secondary amines such as dimethylamine, methylethylamine, diethylamine, di-n-propylamine, di-isopropylamine, methylisopropylamine, di-n-butylamine, di-isobutylamine, methyl-n-butylamine, diallylamine, methylallylamine, pyrrolidine, piperidine, methyl-piperidines and morpholine. In the production of compounds in which $R_3$ is represented by hydrogen it is of advantage if the amine of the general Formula VIII to be reacted has considerably greater reactivity than the secondary amino group of the halogen methyl morpholine compound.

If a halogen methyl morpholine compound of the general Formula VIII is reacted with a tertiary amine of the general formula:

wherein $R'_4$ and $R'_5$ have the meanings given under general Formula IV, for example with trimethylamine, triethylamine, dimethyl-butylamine, dimethyl-allylamine or N-methyl-piperidine, then monoquaternary derivatives are obtained direct, i.e. alkylohalides of compounds of the general Formula I.

The morpholine compounds of the general Formula I form monoacid and diacid salts with inorganic and organic acids such as, for example hydrochloric acid, hydrobromic acid, sulphuric acid, phosphoric acid, tartaric acid and citric acid. Some of these salts are easily soluble in water.

The following examples further illustrate the production of the new morpholine compounds. Parts are given as parts by weight and their relationship to parts by volume is as that of grammes to cubic centimetres. The temperatures are in degrees centigrade.

*Example 1*

16.5 parts of L-ephedrine and 13.0 parts of 1-diethylamino-2.3-epoxy-propane are dissolved together at room temperature, allowed to stand for 2 hours and then heated for one hour at 100°. The viscous reaction product is dissolved in ether and the calculated amount of ethereal sulphuric acid (1 mol) is added. After pouring off the ether, 80 parts by volume of concentrated sulphuric acid are added and the whole is left to stand at room temperature for 3–4 hours. The reaction solution is then poured onto ice, the sulphuric acid solution is shaken out with ether and then made alkaline with caustic soda lye. The base is then taken up in ether, the ethereal solution is dried over potassium carbonate, the ether is evaporated off and the residue is distilled in the high vacuum. The 2-phenyl-3.4-dimethyl-6-diethylaminomethyl-morpholine passes over at 106–107° under 0.02 mm. pressure.

In an analogous manner, 2-phenyl-3.4-dimethyl-6-[N'-γ-dimethyl-aminopropyl)-N'-methyl-aminomethyl]-morpholine can be obtained from 16.5 parts of L-ephedrine and 17.2 parts of 1-[N'-(γ-dimethylaminopropyl)-N'-methylamino]-2.3-epoxypropane, and 2-phenyl-3.4-dimethyl-6-[bis-(2'-methoxy-ethyl)-aminomethyl]-morpholine can be obtained from 18.9 parts of 1-[bis-(2'-methoxy-ethyl)amino]-2.3-epoxypropane, 16.5 parts of ephedrine and 1 part of water.

*Example 2*

2-phenyl-3.4-dimethyl-6-piperidinomethyl-morpholine is obtained as a colourless oil which boils at 116–118° under 0.02 mm. pressure from 16.5 parts of L-ephedrine and 17.0 parts of 1-piperidino-2.3-epoxy-propane in the manner described in Example 1.

The mono-methoiodide is formed from the above base with methyl iodide in isopropanol solution. It is dissolved in alcohol and allowed to crystallise and then melts at 267–268°.

The bis-methoiodide can be isolated from the mother liquors. It melts on decomposition at 225–227°.

Example 3

Also by the method described in Example 1, 2-phenyl-3.4-dimethyl - 6 - morpholinomethyl-morpholine (B.P.$_{0.04}$ 124–125°) is obtained from 16.5 parts of L-ephedrine and 17.0 parts of 1-morpholino-2.3-epoxypropane.

On adding an ethanolic solution of tartaric acid to an ethereal solution of this morpholine derivative, the salt precipitates in the form of a semi-solid mass. On rubbing with ether/ethanol and then recrystallising from abs. ethanol, the bis-tartrate is obtained which melts at over 90° (unclear) while foaming.

Example 4

10 parts of 1-(p-hydroxyphenyl)-2-methylamino-ethanol are dissolved in 50 parts of dimethyl formamide at 90–100°, whereupon 8.6 parts of 1-morpholino-2.3-epoxypropane and 2 parts of water are added and the whole is heated for 20 hours at 90°. After evaporating to dryness in the vacuum, the residue is dissolved in 40 parts by volume of isopropanolic hydrochloric acid, whereupon the solution is again evaporated to dryness in the vacuum. The residue is dissolved in water, the solution is saturated with potassium carbonate and extracted with ether. After evaporating off the ether, an oil is obtained which, after chromotographically purifying through an aluminum oxide column, produces 2-(p-hydroxyphenyl)-4-methyl-6-(morpholinomethyl)-morpholine which melts at 133–134°.

Example 5

13.5 parts of 1-(p-chlorophenyl)-2-amino-propanol, 10.0 parts of 1-piperidino-2.3-epoxypropane and 0.2 part of water are heated for 10 hours at 100°. As described in Example 1, the sulphate of the product obtained is produced. This sulphate is dissolved in 100 parts by volume of concentrated sulphuric acid whereupon the solution is left to stand for 48 hours at room temperature. After diluting with ice water, excess caustic soda lye is added and the whole is extracted with ether. 2-(p - chlorophenyl)-3-methyl-6-(piperidinomethyl)-morpholine is obtained (B.P.$_{0.001\ mm.}$ 130–134°).

In an analogous manner:
2-phenyl-3.4-dimethyl-6-(dibutylaminomethyl) - morpholine (B.P.$_{0.0001\ mm.}$=107–110°) is obtained from 24.8 parts of L-ephedrine and 27.8 parts of 3-dibutylamino-1.2-epoxypropane, 2-phenyl-3.4-dimethyl-6-(N'-methyl-piperazinomethyl)-morpholine (B.P.$_{0.0002\ mm.}$=105–107°) is obtained from 15.6 parts of 3-(N'-methyl-piperazino)-1.2-epoxypropane and 16.5 parts of L-ephedrine, and 2-(3'.4'-dimethyl - phenyl)-3-methyl-6-(piperidinomethyl)-morpholine is obtained from 9.1 parts of 1-(3'.4'-dimethylphenyl)-2-aminopropanol and 6.48 parts of 1-piperidino-2.3-epoxypropane. This compound is obtained at a bath temperature of 165–170° and by distilling under a pressure of 0.01 mm.

Example 6

24 parts of styrol oxide are added slowly dropwise at 60° while stirring to 20 parts of 1.3-diamino-2-propanol and 1 part of water and then the whole is stirred at 60° for 10 hours. 2-phenyl-6-aminomethyl-morpholine is obtained by ring closure according to the method described in Example 1.

2-phenyl-4-methyl-6-(methylaminomethyl)-morpholine can be obtained in an analogous manner from 11.8 parts of 1.3-dimethylamino-2-propanol and 12 parts of styrol oxide.

Example 7

18.1 parts of 1-(3'-methoxyphenyl)-2-amino-propanol, 12.7 parts of 1-piperidino-2.3-epoxypropane and 1 part of water are heated first for 3 hours at 50° and then for 15 hours at 90°. The reaction mass is then dissolved is isopropanol, the hydrochloride of the reaction product obtained is produced while excluding water and the whole is evaporated to dryness in the vacuum. After adding 0.5 part of p-toluene sulphonic acid, it is heated for 10 hours at 180° under reduced pressure (20–30 mm.). The reaction mixture is dissolved in benzene/water and the whole is saturated with potassium carbonate. 2-(3'-methoxyphenyl)-3-methyl-6-piperidinomethyl - morpholine is isolated from the benzene solution.

2-phenyl - 3.4 - dimethyl-6-diallylaminomethyl-morpholine is obtained in an analogous manner from 16.5 parts of L-ephedrine and 15.3 parts of 1-diallylamino-2.3-epoxypropane.

Example 8

0.99 part of 2 - phenyl-6-(pyrrolidinomethyl)-morpholine, produced according to Example 1, are dissolved in 1 part by volume of 95% formic acid. 1 part by volume of 35% formaldehyde solution is added to this solution and the whole is heated for 2 hours at 90–95°. Then formic acid and formaldehyde solution are again added, 0.4 part by volume of each, and the whole is heated for another 2 hours. After adding a slight excess of concentrated hydrochloric acid, the reaction mixture is evaporated to dryness. Recrystallised from ethanol/ethyl acetate, the bis-hydrochloride of 2-phenyl-4-methyl-6-(pyrrolidinomethyl)-morpholine is obtained which melts at 274–278° on decomposition.

Example 9

Allyl chloride is added at 0° to the morpholine derivative produced according to Example 1 from 1-phenyl-2-amino-propanol and 1-diethylamino-2.3-epoxypropane and the whole is left to stand for some time. The whole is then evaporated to dryness, the residue is dissolved in water, the solution is saturated with potassium carbonate and extracted with ether. 2-phenyl-3-methyl-4-allyl-6-diethylaminomethyl-morpholine is obtained by fractional distillation.

As central stimulating agent, for example, per os as appetite suppressant, a compound of the present invention can be given in daily doses of 50–200 mg. for adults; for example 2-phenyl-3.4-dimethyl-6 - piperidinomethyl-morpholine can be administered in dosages of 50–150 mg.

What we claim is:

1. A di-tertiary base selected from the group consisting of 2-phenyl-3.4-dimethyl-6-diethylaminomethyl-morpholine, 2-phenyl-3.4-dimethyl-6-[N'-(γ-dimethylaminopropyl) - N' - methyl - aminomethyl] - morpholine, 2-phenyl - 3.4 - dimethyl - 6 - [bis - (2' - methoxy - ethyl)-aminomethyl] - morpholine, 2 - phenyl - 3.4 - dimethyl-6 - piperidinomethyl - morpholine, 2 - phenyl - 3.4 - dimethyl - 6 - piperidinomethyl - morpholine monomethoiodide, 2 - phenyl - 3.4 - dimethyl - 6 - piperidinomethyl-morpholine dimethoiodide, 2 - phenyl - 3.4 - dimethyl - 6- morpholinomethyl - morpholine, 2 - (p - hydroxyphenyl)-4 - methyl - 6 - (morpholinomethyl) - morpholine, 2-phenyl - 3.4 - dimethyl - 6 - (dibutylaminomethyl) - morpholine, 2 - phenyl - 3.4 - dimethyl - 6 - (N' - methyl-piperazinomethyl) - morpholine, 2 - phenyl - 3.4 - dimethyl - 6 - diallylaminomethyl - morpholine, 2-phenyl-4 - methyl - 6 - (pyrrolidinomethyl) - morpholine and 2 - phenyl - 3 - methyl - 4 - allyl - 6 - diethylaminomethyl-morpholine.

2. 2 - phenyl - 3.4 - dimethyl - 6 - diethylaminomethyl-morpholine.

3. 2 - phenyl - 3.4 - dimethyl - 6 - piperidinomethyl-morpholine.

4. 2 - phenyl - 3.4 - dimethyl - 6 - morpholinomethyl-morpholine.

5. 2 - (p - hydroxyphenyl) - 4 - methyl - 6 - (morpholinomethyl)-morpholine.

6. 2 - phenyl - 3.4 - dimethyl - 6 - (dibutylaminomethyl)-morpholine.

7. 2 - phenyl - 3.4 - dimethyl - 6 - (N' - methyl - piperazinomethyl)-morpholine.

References Cited in the file of this patent

UNITED STATES PATENTS 2,832,777    Kalm _____ Apr. 29, 1958

FOREIGN PATENTS 174,919    Austria _____ May 26, 1953